United States Patent
Koyama et al.

(10) Patent No.: US 6,170,546 B1
(45) Date of Patent: Jan. 9, 2001

(54) HEAVY DUTY PNEUMATIC TIRE INCLUDING VARIABLE WIDTH GROOVES AND CONSTANT WIDTH GROOVES

(75) Inventors: Toshio Koyama, Kobe; Mitsuharu Koya, Akashi, both of (JP)

(73) Assignee: Sumitomo Rubber Industries Ltd., Hyogo-ken (JP)

( * ) Notice: Under 35 U.S.C. 154(b), the term of this patent shall be extended for 0 days.

(21) Appl. No.: 09/104,193

(22) Filed: Jun. 25, 1998

(30) Foreign Application Priority Data

Jun. 27, 1997 (JP) .................................................. 9-172286

(51) Int. Cl.⁷ ........................... B60C 11/11; B60C 11/12; B60C 103/00; B60C 107/00
(52) U.S. Cl. ................... 152/209.18; 152/209.26; 152/209.27; 152/902; 152/DIG. 3
(58) Field of Search .............. 152/209.2, 209.3, 152/209.18, 209.26, 209.27, 209.28, 902, DIG. 3

(56) References Cited

U.S. PATENT DOCUMENTS

| 5,137,068 | * | 8/1992 | Loidl et al. ............... | 152/209.27 |
| 5,327,953 | * | 7/1994 | Ichiki ...................... | 152/DIG. 3 |
| 5,526,860 | * | 6/1996 | Minami .................... | 152/209.27 |
| 5,538,060 | * | 7/1996 | Van Der Meer et al. ..... | 152/DIG. 3 |
| 6,003,575 | * | 12/1999 | Koyama et al. ............ | 152/209.18 |

FOREIGN PATENT DOCUMENTS

| 3424796 | * | 1/1985 | (DE) | .............................. 152/209.18 |
| 393012 A2 | | 10/1990 | (EP) | . |
| 469816 A2 | | 2/1992 | (EP) | . |
| 513676 A1 | | 11/1992 | (EP) | . |
| 718125 A1 | | 6/1996 | (EP) | . |
| 729854 A2 | | 9/1996 | (EP) | . |
| 63-275406 | * | 11/1988 | (JP) | .............................. 152/209.2 |
| 1-254406 | * | 10/1989 | (JP) | .............................. 152/209.18 |
| 3-157207 | * | 7/1991 | (JP) | .............................. 152/209.18 |
| 4-133805 | * | 5/1992 | (JP) | .............................. 152/209.18 |
| 5-254311 | * | 10/1993 | (JP) | .............................. 152/209.28 |
| 6-115322 | * | 4/1994 | (JP) | .............................. 152/209.18 |

OTHER PUBLICATIONS

Japanese Patent Abstract 06171311, vol. 018, No. 503 (M–1677), Sep. 21, 1994.
Japanese Patent Abstract 61226304, vol. 011, No. 071 (M–567), Oct. 8, 1986.
Japanese Patent Abstract 06115320, vol. 018, No. 398 (M–1645), Jul. 26, 1994.

* cited by examiner

*Primary Examiner*—Steven D. Maki
(74) *Attorney, Agent, or Firm*—Birch, Stewart, Kolasch & Birch, LLP (57) ABSTRACT

A heavy duty pneumatic tire comprises a tread portion which is provide with wide circumferential grooves having a width Wm1 of 4.0 mm to 20.0 mm and narrow circumferential grooves having a width Wm2 of not less than 2.0 mm but less than 4.0 mm, and each region which is defined between one of the wide circumferential grooves and the axially adjacent narrow circumferential groove is provided with axial grooves extending from the wide circumferential groove to the narrow circumferential groove to circumferentially divide the region into blocks, wherein the axial grooves include variable-width grooves of which groove width increases from the wide circumferential groove to the narrow circumferential groove.

9 Claims, 6 Drawing Sheets

HEAVY DUTY PNEUMATIC TIRE INCLUDING VARIABLE WIDTH GROOVES AND CONSTANT WIDTH GROOVES

The present invention relates to a pneumatic tire for heavy duty vehicles more particularly to an improvement in the tread portion capable of improving the resistance to abnormal tread wear.

In winter tires, snow tires, studless tires and the like which are used on snowy and icy roads, usually, a necessary road grip on the snow is mainly obtained by the use of tread blocks defined by relatively wide tread grooves, and that on the ice is mainly obtained by the use of a relatively soft tread rubber compound and the edges of the tread rubber formed by the wide tread grooves, narrow grooves and sipes. Accordingly, the blocks are inevitably decreased in the rigidity, and uneven wear is liable to occur between the blocks. As a result, it is difficult to maintain the required snow performance throughout the tread wear life. This is especially remarkable in the pneumatic tires for heavy duty vehicles such as trucks, buses and the like.

The inventors made a study of uneven wear of such tread blocks and found that uneven wear is liable to occur in the blocks divided by a wide circumferential groove and narrow circumferential groove and the wear progresses faster on the wide circumferential groove side of the blocks than the narrow circumferential groove side.

It is therefore, an object of the present invention to provide a heavy duty pneumatic tire in which blocks divided by wide circumferential grooves and narrow circumferential grooves are prevented from abnormal wear and the snow performance can be maintained throughout the tread wear life.

According to the present invention, a heavy duty pneumatic tire is provided in the tread portion with wide circumferential grooves having a width Wml of 4.0 mm to 20.0 mm, narrow circumferential grooves having a width Wm2 of not less than 2.0 mm but less than 4.0 mm, and axial grooves each extending from one of the wide circumferential grooves to the adjacent narrow circumferential groove to form blocks, the axial grooves having a variable-width increasing from the wide circumferential groove to the narrow circumferential groove.

Therefore, the blocks are increased in the rigidity on the wide groove side rather than the narrow groove side, and as a result, the movements of the blocks are evened to decrease abnormal wear.

Embodiments of the present invention will now be described in detail in conjunction with the accompanying drawings, in which.

Figure 1:
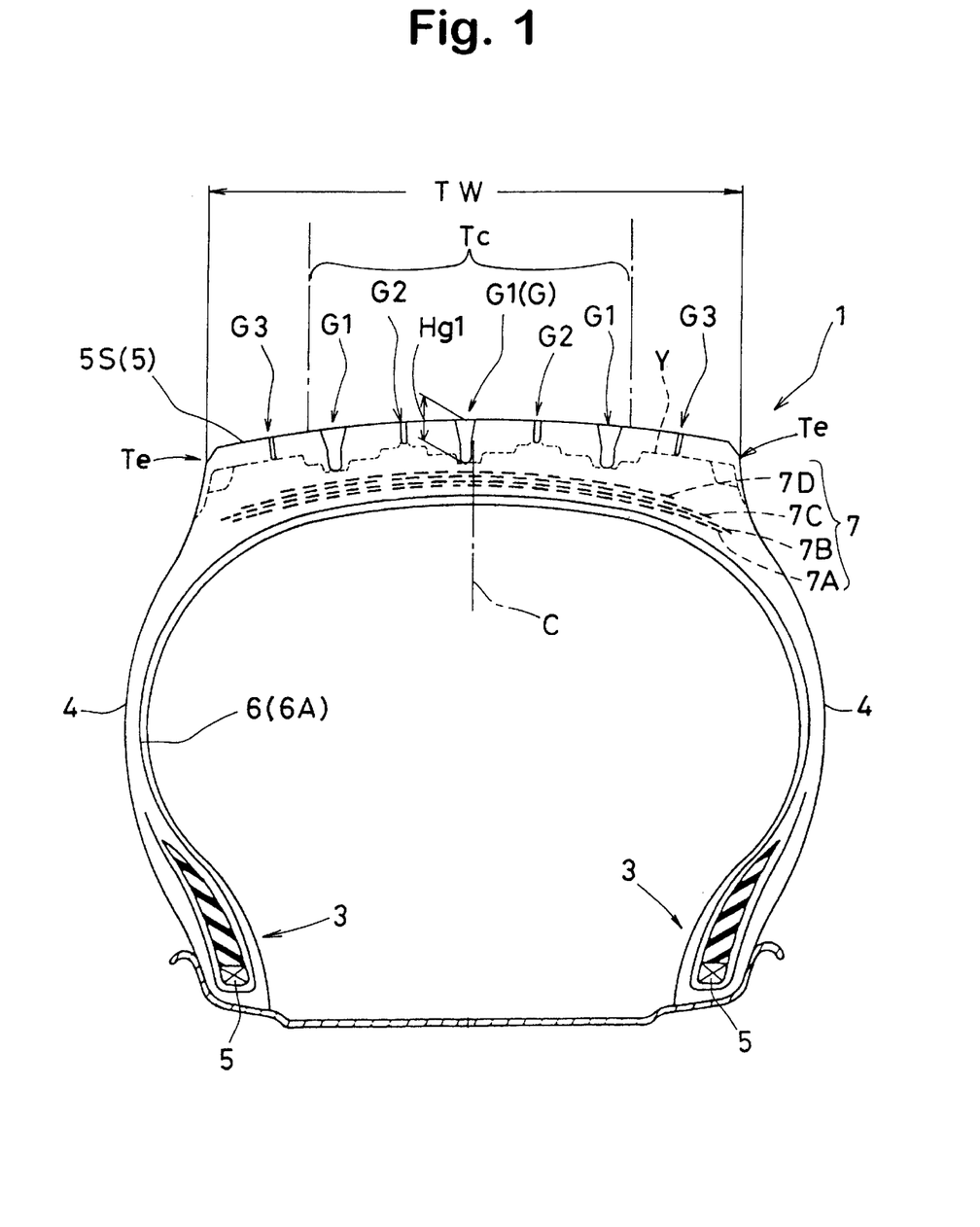
FIG. 1 is a cross sectional view of an embodiment of the present invention.

In FIG. 1, a heavy duty pneumatic tire 1 of the present invention is a winter tire of size 11R22.5.

The tire comprises a tread portion 5, a pair of axially spaced bead portions 3 with a bead core 5 therein, a pair of sidewall portions 4 extending between the tread edges Te and the bead portions 3, a carcass 6 extending between the bead portions, and a belt 7 disposed radially outside the carcass 6 and inside a rubber tread.

In a tire meridian section, the tread face 5S or the outer surface of the tread portion 5 is defined by a convex curved line, for example, a single radius arc having the center on the tire equatorial plane.

The carcass 6 is composed of at least one ply of cords arranged radially at an angle of 70 to 90 degrees with respect to the tire equator C and extending between the bead portions 3 through the sidewall portions 4 and tread portion 5 and turned up around the bead cores 2 from the inside to the outside of the tire to be secured thereto. For the carcass cords, organic fiber cords, e.g. nylon, polyester, rayon, aromatic polyamide fiber and the like, and inorganic fiber cords, e.g. steel cords can be used. The carcass 6 in this example is composed of a single ply 6A of steel cords arranged at an angle of substantially 90 degrees.

The belt 7 comprises at least two cross breaker plies. In this example, the breaker plies include four plies each made of steel cords laid parallel with each other. In the radially innermost first ply 7A, the cord angles are in the range of from 50 to 70 degrees, and in the second to fourth plies 7B, 7C and 7D the cord angles are not more than 30 degrees with respect to the tire equator C.

In the tread face 5S, circumferential grooves G extending continuously in the circumferential direction and axial grooves Y are disposed to form blocks.

The circumferential grooves G comprise wide circumferential grooves G1 having an axial width Wm1 of 4.0 mm to 20.0 mm, and narrow circumferential grooves G2 having an axial width Wm2 of not less than 2.0 mm but less than 4.0 mm.

It is preferable for improving the drainage to dispose the wide circumferential grooves G1 in a central tread region Tc where the ground pressure is high, which region Tc is defined as having a width of 0.6 times the tread width TW.

If all the circumferential grooves G are formed as a wide circumferential groove G1, the total area of the grooved part of the tread is excessively increased, and the wet and dry running performance and wear resistance, especially uneven wear resistance greatly decrease. Contrary, if all the circumferential grooves G are formed as a narrow circumferential groove G2, the required drainage and on-the-snow performance can not be obtained. Thus, the provision of both the wide circumferential grooves G1 and narrow circumferential grooves G2 is essential, and it is especially preferable to dispose them alternately in the axial direction.

Figure 2:
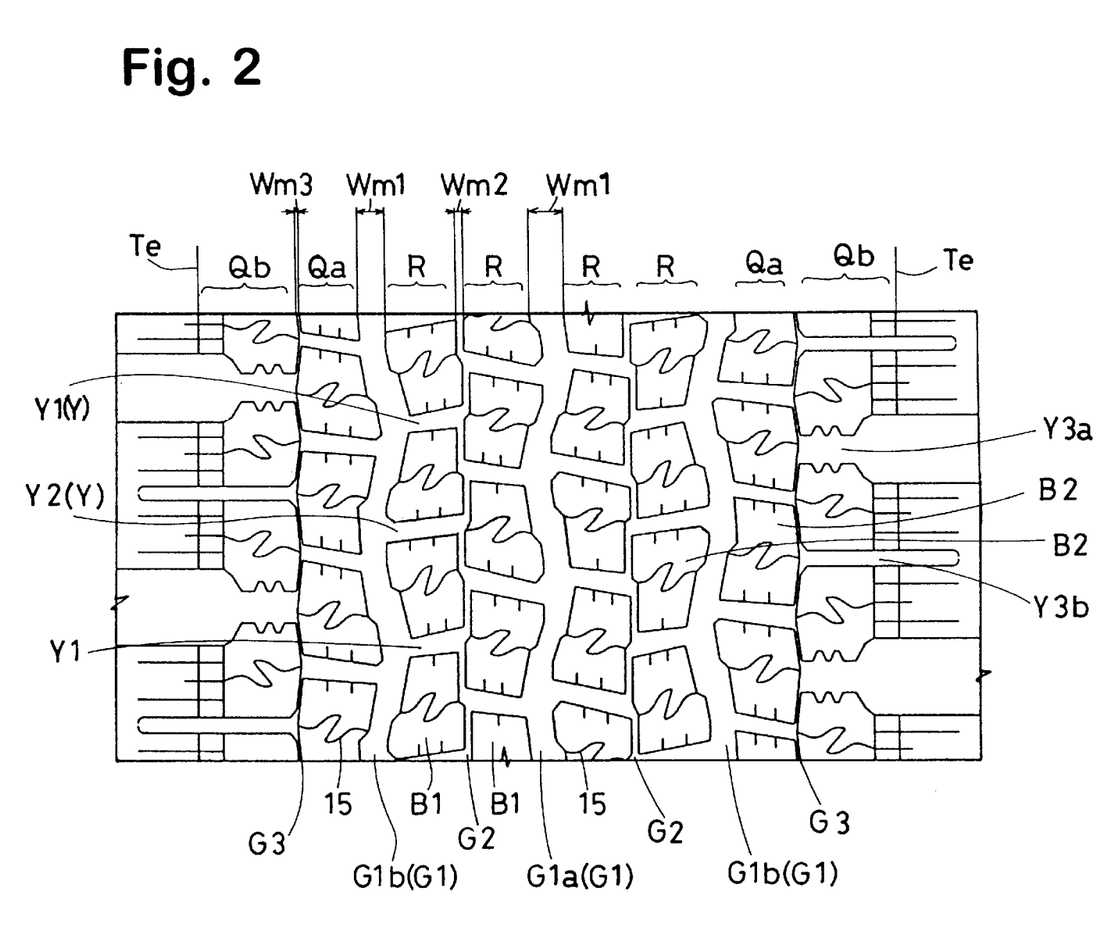
FIG. 2 is a developed plan view showing an example of the tread pattern.

In the example shown in FIG. 2, three wide circumferential grooves G1 and two narrow circumferential grooves G2 are disposed alternately in the axial direction, and in addition thereto, two fine grooves G3 having an axial width Wm3 of less than 2.0 mm are further disposed in the tread face 5S. The three wide grooves G1 are a groove G1a extending on the tire equator C and a groove G1b disposed on each side of the tire equator C. The fine grooves G3 are disposed between the axially outer wide grooves G1b and the adjacent tread edges Te. The grooves Gi have a depth Hg1 and are deeper than any other groove of the circumferential grooves G and axial grooves Y. The wide grooves Gi in this example are a zigzag groove, and the grooves width is periodically varied in the circumferential direction according to the zigzag pitches. For example, the groove depth Hg1 is 18 to 21 mm, the minimum width is 7 mm, and the maximum width is 13 mm. The narrow grooves G2 and fine groove G3 in this example are zigzag grooves each having a substantially constant groove width. But, it may be possible to vary the groove width within the range between the minimum width and maximum width in the same manner as the wide circumferential grooves Gi. The groove depths of the narrow grooves G2 and fine groove G3 are not more than the groove depth Hg1 of the wide grooves G1, and in this example, these are set in the range of from 10 to 13 mm.

The regions R between the adjacent wide and narrow grooves G1 and G2 are each provided with axial grooves Y extending across the full width of the region R to divide the region into a circumferential row of blocks B1.

The axial grooves disposed in each region Ra, Rb include variable-width grooves Y1 whose width Wy increases from the open end 10 on the wide groove G1a side to the open end 11 on the narrow groove G2a side. The region Ra is between the wide groove G1a and the narrow groove G2, and the region Rb is between the narrow groove G2 and the wide groove G1b.

Figure 3:
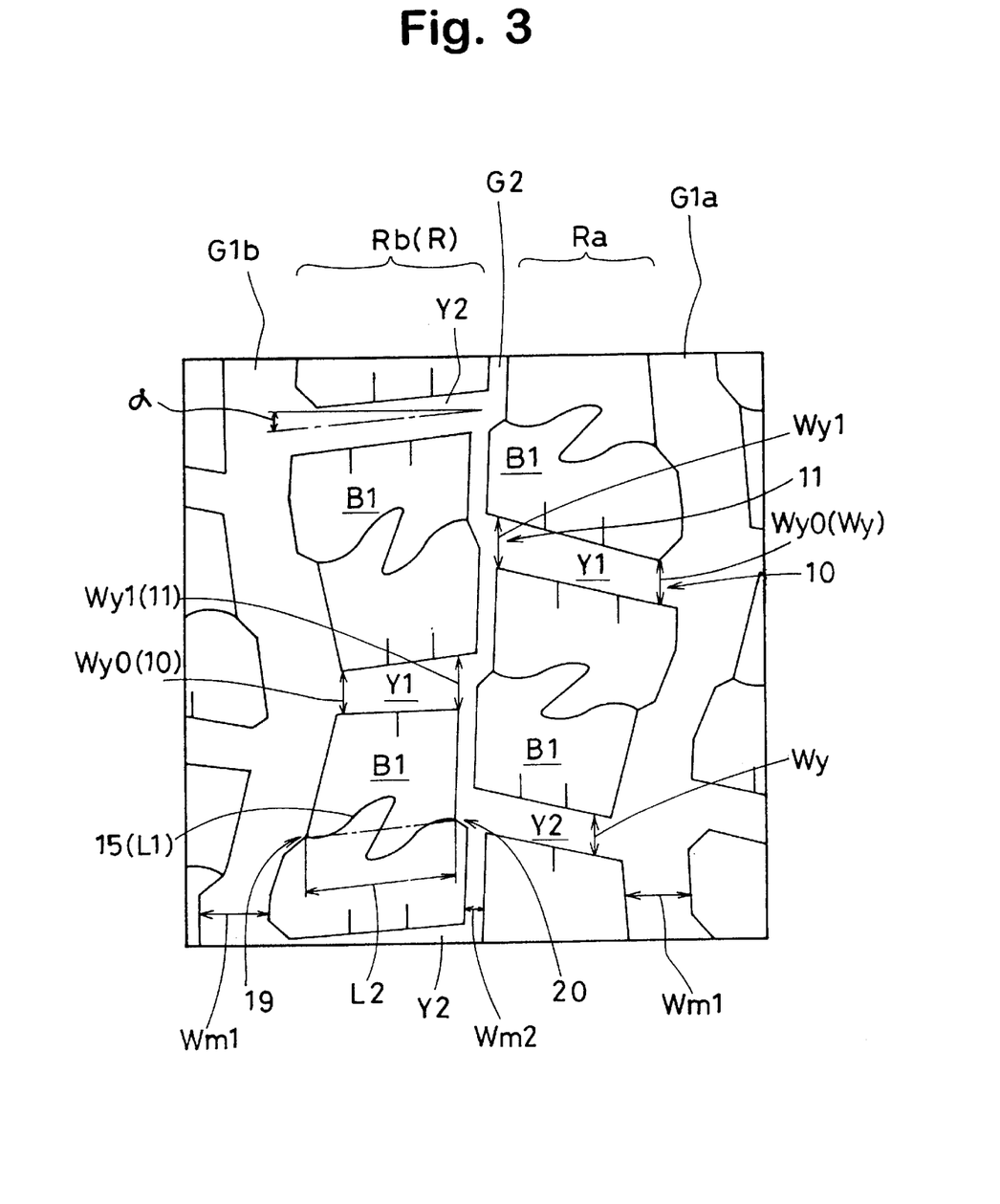
FIG. 3 is an enlarged partial plan view showing an example of the variable width axial groove and constant width axial groove.

The axial grooves in this example further include constant-width axial grooves Y2 whose width Wy is constant. Here, the widths Wy of the axial grooves are defied as the width measured in the circumferential direction of the tire. The variable-width grooves Y1 and the constant-width grooves Y2 are disposed alternately in the axial direction. The constant-width axial grooves Y2 are arranged in substantially parallel with the variable-width grooves Y1. In this example, the axial grooves Y are straight grooves extending at small angles $\alpha$ to the tire axial direction. The angle $\alpha$ is defined as of the groove center line, and set in the range of not more than 30 degrees, preferably not more than 20 degrees, more preferably not more than 15 degrees for the grip performance. Also it may be possible to form the axial grooves Y as a curved groove, a bent or zigzag groove, or the like. In this case, the above-mentioned angle $\alpha$ is may be defied as of the straight line drawn from the groove center at one of the open ends 10 and 11 to that at the other.

The width Wy of the variable-width grooves Y1 increases continuously from the open end 10 to the open end 11 at a substantially constant rate. However, it may be possible to change the width Wy at a variable rate or step-by-step.

The difference (Wy1–Wy0) of the width Wy1 at the open ends 11 from the width Wy0 at the open ends 10 is about 0.5 to 2.5 mm or 0.02 to 0.2 times the length Ky of the variable-width groove Y1.

The average (Wy1+Wy0)/2 of the variable width Wy is not less than 4.0 mm, preferably not less than 5.0 mm.

On the other hand, the width Wy of the constant-width axial grooves Y2 is set in the range of from 0.7 to 1.5 times the average width (Wy1+Wy0)/2.

As a result, the circumferential length of the blocks B1 is increased on the wide circumferential groove G1 side more than the narrow circumferential groove G2 side, and the blocks B are optimized in respect of the rigidity in the circumferential direction, and the uneven wear can be minimized.

It may be possible to form all the axial grooves as the variable-width groove Y1, but the alternate variable-width and constant-width groove arrangement is somewhat preferable because a variable-width groove is a little inferior to a constant-width groove in respect of drainage and the resistance to being blocked by the packed snow. In addition to the above-mentioned regular alternate arrangement, the variable-width grooves Y1 and the constant-width grooves Y2 may be arranged irregularly. In any case, such arrangements are most effectual in the above-mentioned central tread region Tc where the ground pressure is high.

The blocks B1 in the regions Ra and Rb are each provided with sipes 15 extending axially between the circumferential grooves G1 and G2 in order to obtain the required on-the-ice performance. The sipes 15 are a cut or slit having a width of 0.4 to 1.0 mm, and the depth of the sipes 15 is 0.4 to 0.7 times the depth Hg1 of the wide circumferential grooves G1 and not more than the depth of the narrow circumferential grooves G2. The number of the sipes 15 is one per a block. The total length L1 of a sipe 15 therealong is set in the range of from 1.0 to 3.0 times the straight length L2 between the ends 19 and 20 thereof. If the number of the sipes 15 is two or more per block and/or L1/L2 is more than 3.0, even the minimal block rigidity required for the heavy duty tires can not be obtained, and blocks are liable to be torn off.

Figure 4:
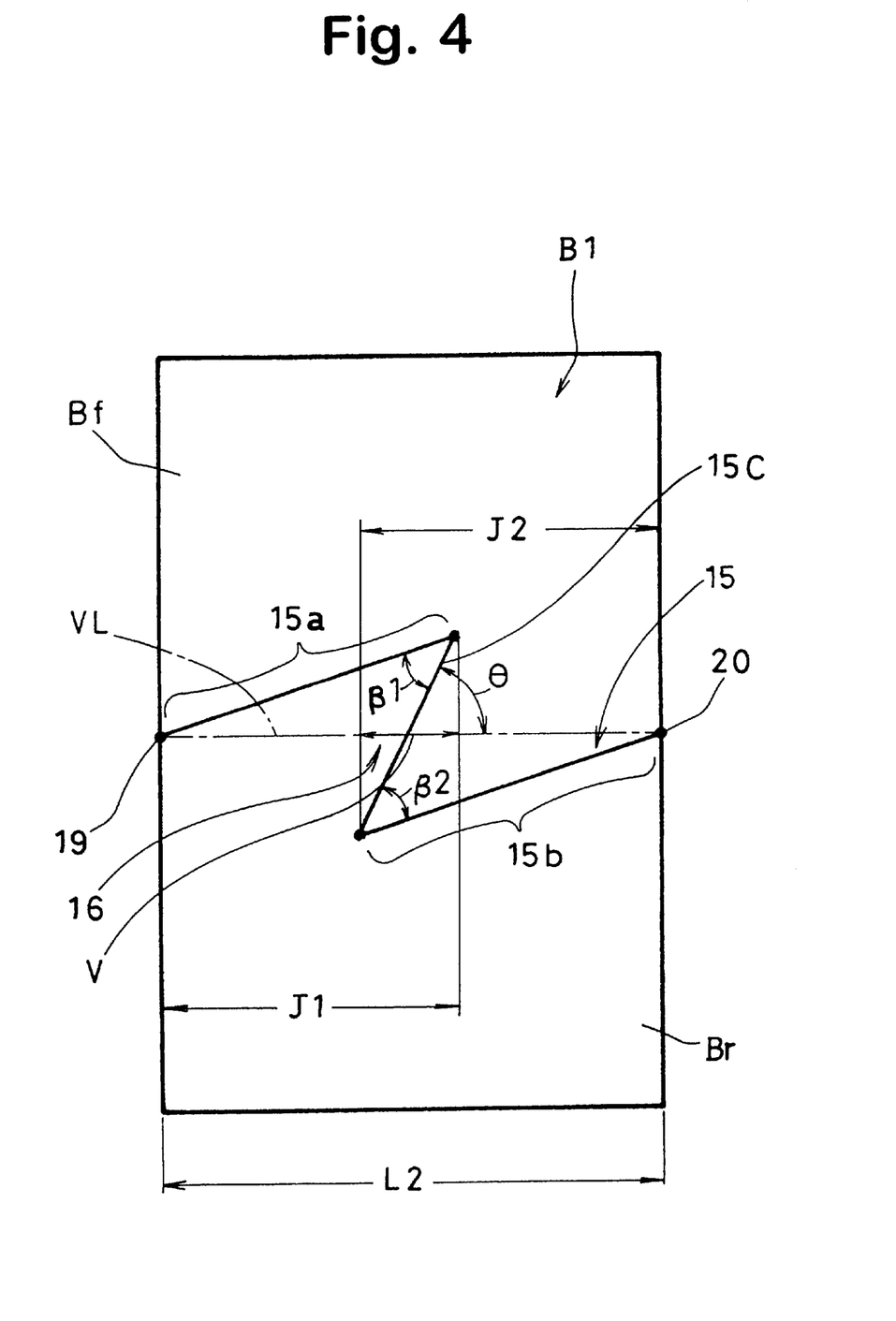
FIG. 4 is a schematic view showing a typical model of the sipe.

The sipe 15 in this example has a substantially Z-shaped configulation formed by a first segment 15a extending from one end 19, a second segment 15b extending from the other end 20, and a third segment 15c extending therebetween as shown in FIG. 4 as a typical model. The straight line VL drawn between the ends 19 and 20 is substantially parallel to the axial grooves Y such that the angle difference therebetween is limited to within plus/minus five degrees.

The sum (J1+J2) of the lengths J1 and J2 of the components of the segments 15a and 15b in the direction parallel to the straight line VL is more than the length of the straight length L2. Accordingly, the segments 15a and 15b are overlapped in the circumferential direction.

The length V of the overlap 16 of the segments 15a and 15b is preferably set to meet V/J1=0.1 to 0.9, and V/J2=0.1 to 0.9.

If V/J1 or V/J2 is less than 0.1, the sipe is liable to crack in the bottom. If more than 0.9, the intersecting angles $\beta$ 1 and $\beta$ 2 between the segments 15a, 15b and 15c become too small, and the sipe is liable to crack at the intersecting points. Therefore, the crossing angles $\beta$ 1 and $\beta$ 2 are not less than 16 degrees, preferably not less than 24 degrees but not more than 70 degrees. The angle $\theta$ of the central third segment 15c is in the range of from 30 to 83 degrees with respect to the straight line VL.

By the generally Z-shape configuration, the edge length is increased to improve on-the-ice performance. Further, as the pieces Bf and Br of a block divided by the sipe 15 are engaged each other, movements thereof are controlled, that is, the block is increased in the apparent rigidity. Therefore, not only the blocks are prevented from being damaged but also the steering stability is improved. Further, on-the-ice performance and the resistance of block to uneven wear can be improved.

In this example, the region Qa between the outer wide circumferential groove G1b and the fine circumferential groove G3, and the region Qb between the fine circumferential groove G3 and the tread edge Te, are provided with axial grooves to divide each region Qa, Qb into a circumferential row of blocks B2. The blocks B2 are each provided with one sipe 15.

Similarly to the above-mentioned axial grooves in the regions Ra and Rb, the axial grooves in the region Qa include alternately arranged constant-width axial grooves Y2 and variable-width grooves Y1 whose width Wy increases from the open end 10 on the wide circumferential groove G1 side to the open ends 12 on the fine circumferential groove G3 side.

In the axially outer region Qb, wide axial grooves Y3a and narrow axial grooves Y3b are alternately disposed to improve the grip performance and to control a temperature rise in the vicinity of tread edge during running.

Figure 5:
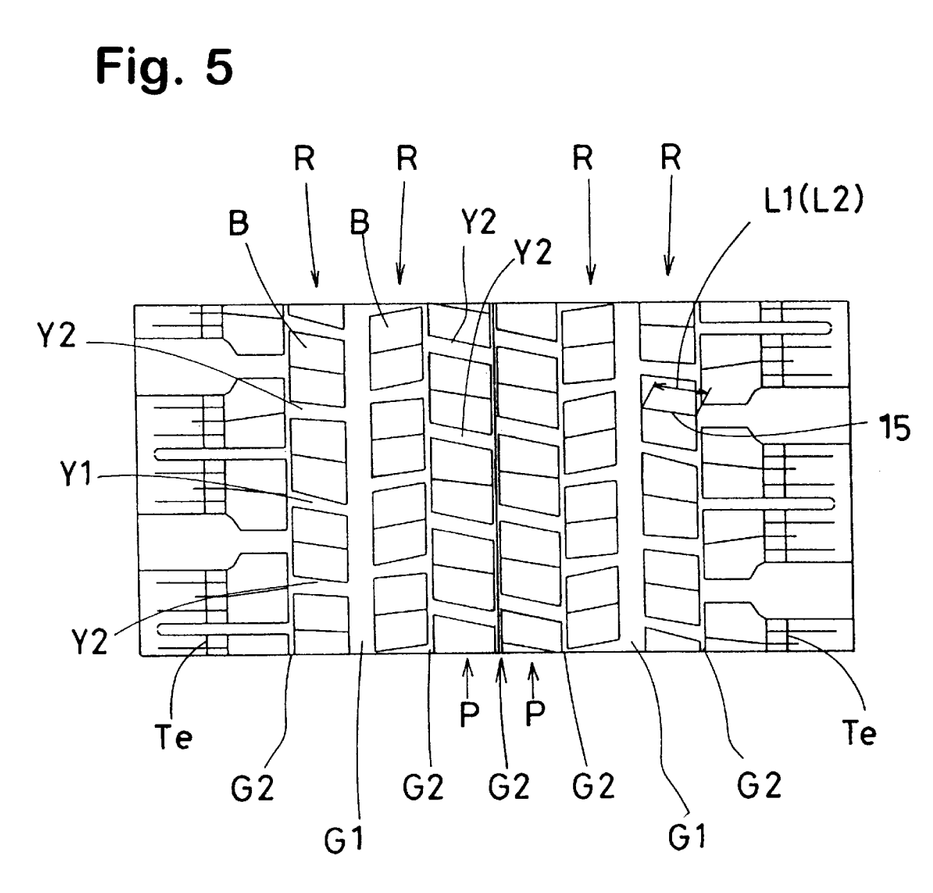
FIG. 5 is a developed plan view showing another example of the tread pattern.

FIG. 5 shows another example of the tread portion, which is provided with two wide circumferential grooves G1 disposed in the central tread region Tc, three narrow circumferential grooves G2 disposed between the two wide circumferential grooves G1, and two narrow circumferential grooves G2 each disposed between one of the wide circumferential grooves G1 and the adjacent tread edge Te. All the circumferential grooves G1 and G2 are straight and the widths are constant along the longitudinal direction. However, it may be possible to use a straight groove, zigzag groove and wavy groove alone or in combination.

Each of the four regions R between the adjacent wide circumferential grooves G1 and narrow circumferential grooves G2 is provided with variable-width grooves Y1 and constant-width axial grooves Y2 which are alternately disposed in the circumferential direction.

The regions P between the adjacent narrow circumferential grooves G2 are provided with constant-width axial grooves Y2. However, it may be possible that variable-width grooves Y1 and constant-width axial grooves Y2 are alternately disposed in the circumferential direction.

All the blocks B in the tread portion are each provided with a straight sipe 15 being substantially parallel with the axial grooves Y1 and Y2. However, it may be possible to use Z-shaped sipes and the like.

Comparison Tests

Test tires were made by way of test and tested for the snow performance, uneven wear resistance and wear resistance.

The test tires were the same internal structure shown in FIG. 1 except for the tread pattern. The specifications of the tread pattern are given in Table 1.

Carcass: one ply of steel cords (3+7) arranged radially at 90 deg.

Belt: four plies of steel cords (3+6)

Belt cord angle (deg.): 50/18/18/18 (radially inside to outside)

Belt cord inclination: Right/Right/Left/Left

Tread width TW: 230 mm

Tire size: 11R22.5

Rim size: 7.50×22.5

Inner pressure: 8.0 kgf/sq.cm

Test car: 10 ton truck (wheel type: 2/2-D)

Snow Performance Test

A braking test and a starting test were conducted.

In the braking test, the distance to stop when a full wheel lock braking is applied to the test car running on a snowy test road at a speed of 30 km/h was measured. The results are indicated in table 1, using an index based on Ref. 1 being 100, where the larger the index, the shorter the braking distance.

In the starting test, starting and accelerating the test car on the snowy road, the traction was evaluated by the driver's feeling. The results are also indicated in table 1, using an index based on Ref.A1 and Ref.B1 being 100, where the larger the index, the larger the traction.

Uneven Wear Resistance Test

The test car was run on dry asphalt-surfaced roads for 5,000 km, and then the wear difference of each block between a wide-groove-side part and a narrow-groove-side part was measured.

Wear resistance test

The test car was run on dry asphalt-surfaced roads for 30,000 km, making a tire rotation. Then, the wear of each block was measured to obtain the mean value. The ratio of the running distance to the mean value was calculated as the wear resistance. Thus the larger the value, the better the wear resistance.

Total Performance Test

Based on the above-mentioned snow performance, uneven wear resistance and wear resistance, the total performance of the tires was evaluated for a winter tire. The results are indicated by an index based on Ref.A1 and Ref.B1 being 100. The larger the value, the better the overall performance.

TABLE 1

Figure 6:
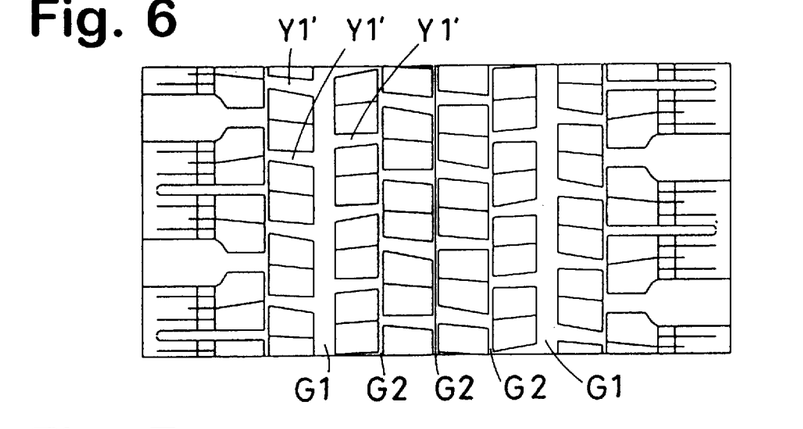
FIGS. 6, 7 and 8 are developed plan views showing the tread patterns of the reference tires in Table 1.
Figure 7:
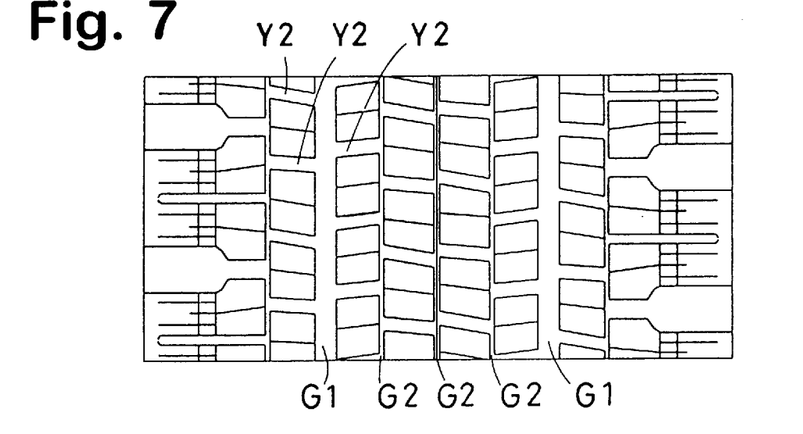
Figure 8:
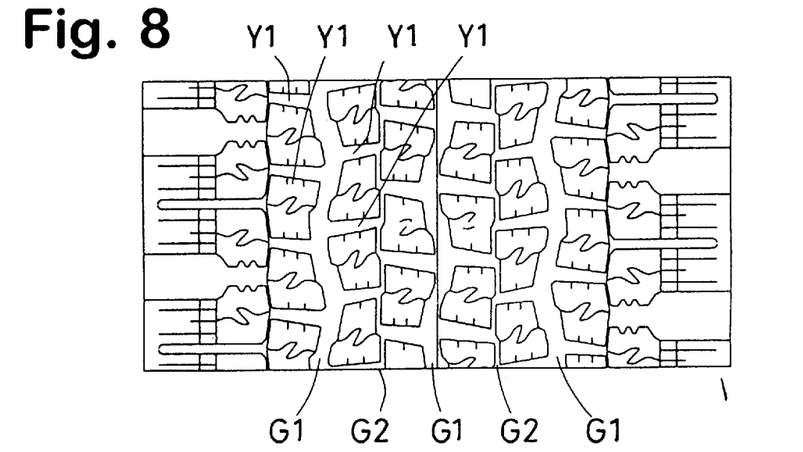

| Tire<br>Tread pattern | Ref.A1<br>Fig.6 | Ref.A2<br>Fig.7 | Ex.A1<br>Fig.5 | Ref.B1<br>Fig.8 | Ex.B1<br>Fig.2 |
|---|---|---|---|---|---|
| Wide circumferential groove | | | | | |
| Width Wm1 (mm) | | | 11 (average) | | |
| Depth Hg1 (mm) | | | 20.6 | | |
| Narrow circumferential groove | | | | | |
| Width Wm2 (mm) | | | 2.5 | | |
| Depth (mm) | | | 12 | | |
| Variable-width axial groove | | | | | |
| Width (Wy1 + Wy0)/2 (mm) | — | | 5 to 6 | | |
| Wy1-Wy0 (mm) | — | | 0.5 to 2.0 | | |
| Constant-width axial groove | | | | | |
| Width (mm) | 5 | | 5 | | |
| Snow performance | | | | | |
| Braking | 100 | 103 | 100 | 100 | 100 |
| Starting | 100 | 103 | 98 | 100 | 102 |
| Uneven wear resistance (mm) | 2.2 | 2.6 | 2 | 2 | 1.6 |
| Wear resistance (km/mm) | 12000 | 11000 | 14000 | 16000 | 17000 |
| Total performance | 100 | 100 | 102 | 100 | 102 |

As apparent from Table 1, Ex.A1 was slightly inferior to Ref.A1 having constant-width axial grooves only when new in respect of on-the-snow starting performance, but superior in respect of the uneven wear resistance and wear resistance. Accordingly, the fully snow performance can be displayed stably from the initial stage to the final stage of the tread wear life.

As to Ref.A2 which was provided with variable-width grooves Y1' whose groove width decreased from the wide circumferential groove to the narrow circumferential groove instead of the variable-width grooves Y1, the blocks more worn on the wide circumferential groove side than the narrow circumferential groove side. As a result, the uneven wear resistance and wear resistance were further decreased. Ref. A2 was superior to Ex.A1 in the snow performance when new, but the snow performance was quickly decreased as the tire was used. And there is the possibility that the blocks are torn off.

Ex.B1 was improved in the snow performance, uneven wear resistance and wear resistance in comparison with Ref. B1 in which the variable-width grooves Y were disposed instead of the variable-width grooves Y.

What is claimed is:

1. A heavy duty pneumatic tire comprising
   a tread portion, the tread portion provided with wide circumferential grooves having a width of 4.0 mm to 20.0 mm and narrow circumferential grooves having a width of not less than 2.0 mm but less than 4.0 mm,
   regions each defined between one of the wide circumferential grooves and the axially adjacent narrow circumferential groove, each said region provided with axial grooves extending from the wide circumferential groove to the narrow circumferential groove to circumferentially divide the region into blocks, the axial grooves in each said region including variable-width grooves of which groove width increases from the wide circumferential groove to the narrow circumferential groove continuously at a substantially constant rate, and constant-width axial grooves of which groove width is constant.

2. A heavy duty pneumatic tire according to claim 1, wherein the variable-width grooves and the constant-width grooves are disposed alternately in the tire circumferential direction.

3. A heavy duty pneumatic tire according to claim 1, wherein said blocks are provided with sipes extending from the wide circumferential groove to the narrow circumferential groove.

4. A heavy duty pneumatic tire according to claim 1, wherein each said block is provided with a sipe extending from the wide circumferential groove to the narrow circumferential groove, and the length of the sipe is in the range of from 1.0 to 3.0 times the distance between the ends of the sip.

5. A heavy duty pneumatic tire according to claim 1, wherein the wide circumferential grooves and the narrow circumferential grooves are disposed alternately in the tire axial direction, and said circumferential grooves include at least two narrow grooves and at least three wide grooves.

6. A heavy duty pneumatic tire according to claim 5, wherein the wide circumferential groove has a width of 7.0 to 20.0 mm.

7. A heavy duty pneumatic tire according to claim 1, wherein the wide circumferential grooves and the narrow circumferential grooves are disposed alternatively in the tire axial direction.

8. A heavy duty pneumatic tire according to claim 7, wherein the wide circumferential groove has a width of 7.0 to 20.0 mm.

9. A heavy duty pneumatic tire according to claim 1, wherein the wide circumferential groove has a width of 7.0 to 20.0 mm.

* * * * *